(12) United States Patent
Butcher et al.

(10) Patent No.: US 10,356,015 B2
(45) Date of Patent: Jul. 16, 2019

(54) EXECUTION TRACES

(71) Applicant: Dell Products L.P., Round Rock, TX (US)

(72) Inventors: Wade Andrew Butcher, Cedar Park, TX (US); Kurtis John Bowman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 15/499,149

(22) Filed: Apr. 27, 2017

(65) Prior Publication Data

US 2018/0316629 A1    Nov. 1, 2018

(51) Int. Cl.
| | |
|---|---|
| *G06F 3/06* | (2006.01) |
| *H04L 29/08* | (2006.01) |
| *H04L 12/861* | (2013.01) |

(52) U.S. Cl.
CPC ............. *H04L 49/90* (2013.01); *G06F 3/061* (2013.01); *G06F 3/067* (2013.01); *G06F 3/0638* (2013.01); *G06F 3/0656* (2013.01); *H04L 67/1097* (2013.01)

(58) Field of Classification Search
CPC ..... H04L 49/90; H04L 67/1097; G06F 3/061; G06F 3/0638; G06F 3/0656
See application file for complete search history.

(56) References Cited

U.S. PATENT DOCUMENTS

| | | | | |
|---|---|---|---|---|
| 6,467,083 | B1* | 10/2002 | Yamashita | G06F 11/3466 711/156 |
| 7,260,692 | B1* | 8/2007 | Zahavi | G06F 11/3034 710/18 |
| 8,042,007 | B1* | 10/2011 | Chan | G06F 11/3648 714/45 |
| 2003/0005266 | A1* | 1/2003 | Akkary | G06F 9/30072 712/220 |
| 2009/0233611 | A1* | 9/2009 | Olsson | H04L 43/0817 455/446 |
| 2016/0147653 | A1* | 5/2016 | Accapadi | G06F 11/3636 711/154 |

(Continued)

OTHER PUBLICATIONS

Intel Trace Hub (Intel TH) Developer's manual Revision 2.1.1, Dec. 2016, 549 pages.

(Continued)

*Primary Examiner* — Ivan O Latorre
(74) *Attorney, Agent, or Firm* — Baker Botts L.L.P.

(57) ABSTRACT

In one or more embodiments, one or more systems, processes, and/or methods may utilize a trace unit that stores trace data via a trace buffer in a memory medium and may utilize a network interface that provides the trace data from the trace buffer to a network. In one example, the network interface may provide the trace data from the trace buffer to the network in response to a trigger. In one instance, the trigger may include a modification of a pointer to an address of the trace buffer. In another instance, the trigger may include an expiration of a timer. In another example, the trace unit may filter the trace data. In one or more embodiments, storing the traced data and providing the trace data to the network may be performed without involving a main processor of an information handling system that includes the trace unit.

18 Claims, 4 Drawing Sheets

(56) References Cited

U.S. PATENT DOCUMENTS

2017/0187587 A1* 6/2017 Keppel ................ H04L 43/062

OTHER PUBLICATIONS

Intel Trace Hub (Intel TH) Developer's manual Revision 1.0.2, Feb. 2016, 383 pages.
Understanding IWARP: Delivering Low Latency to Ethernet, INTEL, Technology Brief, 2010, 2 pages.
Jeffrey Tippet, "Kernel debugging over the network" Microsoft at https://blogs.msdn.microsoft.com/ndis/2014/03/10/kernel-debugging-over-the-network/, Mar. 10, 2014, 3 pages.
Intel Trace Hub Faster Software Debug Finding Root Cause at https://www.asset-intertech.com/eresources/intel-trace-hub-faster-software-debug-finding-root-cause , 2 pages, Printed Apr. 14, 2017.

* cited by examiner

//EXECUTION TRACES

BACKGROUND

Field of the Disclosure

This disclosure relates generally to information handling systems and more particularly to utilizing trace units of respective information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the past, software debugging was often performed in real-time. Moreover, when a problem was reported, a person in charge of troubleshooting usually needed to reproduce conditions of the problem and observe the problem to determine one or more of a cause and a fix. This was frequently difficult. This issue spans the information technology industry. In software and/or firmware development, one tool devised to contend with this problem is an execution trace buffer. This is also a dated concept, available with in-circuit emulators and more recently designed into ASICs (application specific integrated circuits) alongside main processors. These tools can generate execution traces, but the execution traces are too large to store locally. Hence, a lot of information from the execution traces is lost, either by not producing enough information in an attempt to reduce an execution trace size or by overwriting information in the execution trace buffer.

SUMMARY

In one or more embodiments, one or more systems, processes, and/or methods may utilize a trace unit that stores trace data via a trace buffer in a memory medium and may utilize a network interface that provides the trace data from the trace buffer to a network. In one example, the network interface may provide the trace data from the trace buffer to the network in response to a trigger. In one instance, the trigger may include a modification of a pointer to an address of the trace buffer. In a second instance, the trace buffer may include a circular queue, and the point to the address of the trace buffer may store an address of a tail of the circular queue. In another instance, the trigger may include an expiration of a timer that expires after an amount of time transpires. In another example, the trace unit may filter the trace data based on at least one of a subset of processor instructions and at least one event before the trace unit stores the trace data via the trace buffer. In one or more embodiments, the trace unit may store the trace data via the trace buffer, without involving a main processor of an information handling system that includes the trace unit, and the network interface may provide the trace data from the trace buffer to the network, without involving the main processor.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
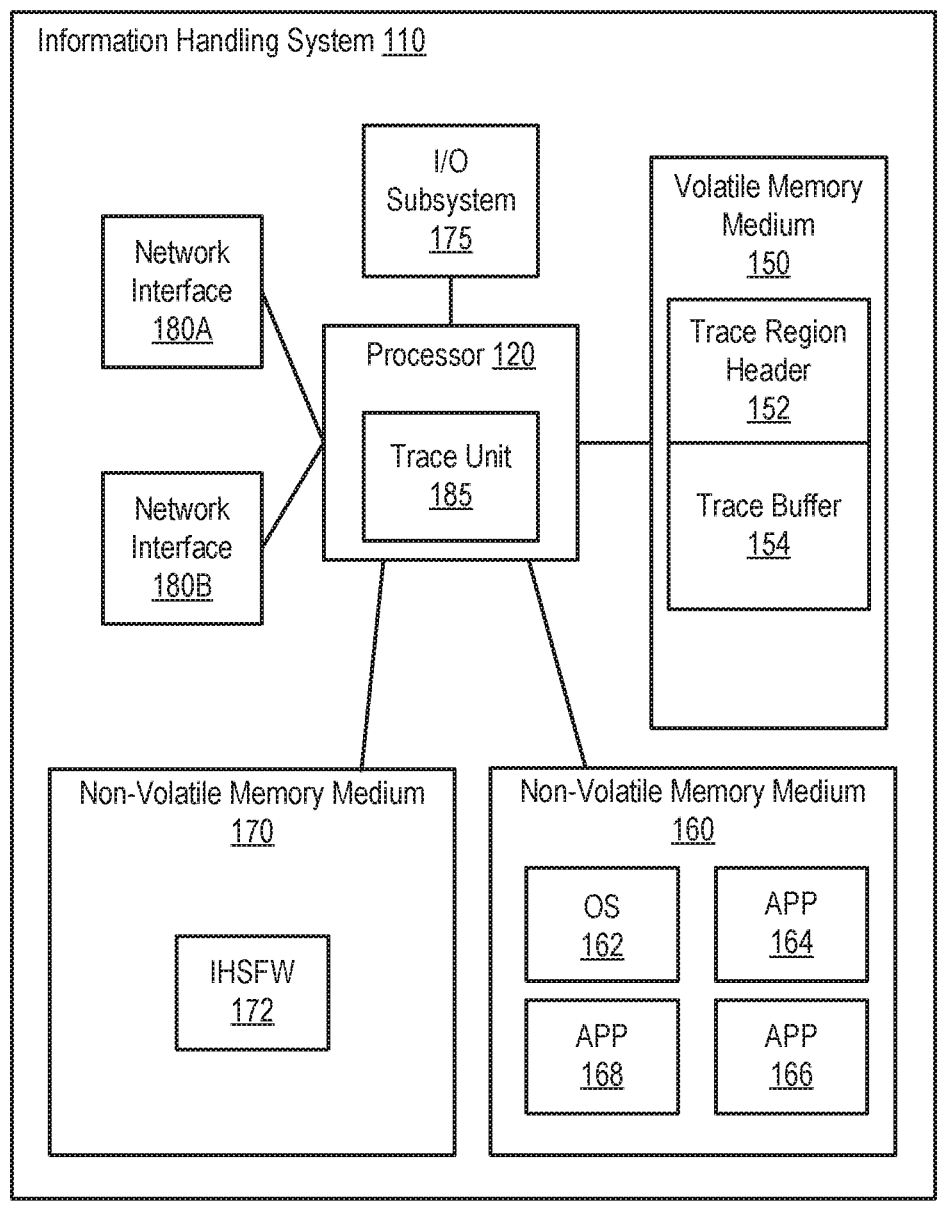
FIG. 1 illustrates an exemplary information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, a trace unit may capture trace data from various sources of an information handling system. For example, the trace unit 185 may capture trace data from one or more of a processor of the information handling system, system trace messaging, a management controller, and architectural event trace, among others. In one or more embodiments, trace data may chronicle one or more interactions between hardware and software and/or one or more behaviors of one or more interactions of hardware. In one example, the trace data may chronicle one or more instruction execution traces of one or more cores of a processor of the information handling system. In another example, the trace data may chronicle one or more interrupt traces of the information handling system.

In one or more embodiments, a trace unit may store trace data in a memory medium of the information handling system. For example, the trace unit may store trace data in one or more buffers of the memory medium. In one or more embodiments, remote direct memory access (RDMA) may be utilized with the one or more buffers of the memory medium in transferring, via a network, the trace data to another information handling system and/or to a network attached storage device and/or system. For example, transferring the trace data to another information handling system and/or to the network attached storage device and/or system may permit additional trace data to be stored via the one or more buffers. For instance, capturing the trace data may not be delayed and/or discarding the trace data and replacing the trace data with the additional trace data may not occur if the trace data is transferred to another information handling system and/or to the network attached storage device and/or system. In this fashion, the trace data may span time periods of hours or days, according to one or more embodiments.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and network interface 180A and 180B. As illustrated, volatile memory medium 150, non-volatile memory media 160 and 170, I/O subsystem 175, and network interfaces 180A and 180B may be communicatively coupled to processor 120.

In one or more embodiments, one or more of volatile memory medium 150, non-volatile memory media 160 and 170, I/O subsystem 175, and network interfaces 180A and 180B may be communicatively coupled to processor 120 via one or more buses, one or more switches, and/or one or more root complexes, among others. In one example, one or more of volatile memory medium 150, non-volatile memory media 160 and 170, I/O subsystem 175, and network interfaces 180A and 180B may be communicatively coupled to processor 120 via one or more PCI-Express (PCIe) root complexes. In a second example, one or more of I/O subsystem 175 and network interfaces 180A and 180B may be communicatively coupled to processor 120 via one or more PCIe switches. In another example, one or more of volatile memory medium 150, non-volatile memory media 160 and 170, I/O subsystem 175, and network interfaces 180A and 180B may be communicatively coupled to processor 120 via a platform controller hub.

In one or more embodiments, term "memory medium" may mean a "storage device", a "memory", a "memory device", "tangible computer readable storage medium", and/or "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

As shown, processor 120 may include a trace unit 185. For example, trace unit 185 may be or include an Intel trace hub. In one or more embodiments, a platform controller hub (not specifically illustrated) may include trace unit 185. In one example, the platform controller hub may be external to processor 120. In another example, processor 120 and one or more components of IHS 110 may be included in a system-on-chip (SoC). For instance, the SoC may include processor 120 and the platform controller hub.

In one or more embodiments, trace unit 185 may capture trace data from various sources of IHS 110. For example, trace unit 185 may capture trace data from one or more of system trace messaging (STM), a management controller, and architectural event trace (AET), among others. For instance, the management controller may be or include an Intel Management Engine. In one or more embodiments, trace unit 185 may capture the trace data that may chronicle and/or provide one or more interactions between hardware and software and/or one or more behaviors of the one or more interactions of hardware. For example, trace unit 185 may provide instruction execution trace data of one or more cores of processor 120.

As illustrated, volatile memory medium 150 may store a trace region header 152 and a trace buffer 154. In one or more embodiments, IHSFW 172 may allocate one or more of trace region header 152 and trace buffer 154. In one or more embodiments, RDMA may be utilized to transfer trace data captured by trace unit 185 to another IHS via a network. For example, utilizing RDMA may provide and/or implement zero-copy networking. For instance, network interface 180 may transfer trace data from trace buffer 154 to a network. In one or more embodiments, utilizing RDMA may eliminate copying trace data from trace buffer 154 to one or more data buffers of OS 162 and providing the trace data from the one or more data buffers of OS 162 to network interface 180. For example, copying the trace data from trace buffer 154 to the one or more data buffers of OS 162 and providing the trace data from the one or more data buffers of OS 162 to network interface 180 may involve utilizing processor 120. For instance, utilizing processor 120 may involve one or more OS 162, one or more caches of processor 120, and one or more context switches, among others.

In one or more embodiments, utilizing RDMA to transfer trace data captured by trace unit 185 to another IHS via a network may provide one or more advantages. In one example, a first advantage may include not involving processor 120 (e.g., a main processor). In one instance, trace data may include one or more metrics and/or performance information associated with processor 120, and utilizing processor 120 in transferring the trace data may alter the one or more metrics and/or performance information associated with processor 120. In a second instance, trace data may include one or more metrics and/or performance information associated with one or more caches of processor 120, and utilizing the one or more caches of processor 120 in transferring the trace data may alter the one or more metrics and/or performance information associated with the one or more caches of processor 120. In a second example, a second advantage may include not involving OS 162. In one instance, trace data may include one or more metrics and/or performance information associated with OS 162, and utilizing OS 162 in transferring the trace data may alter the one or more metrics and/or performance information associated with OS 162. In another instance, involving OS 162 to transfer the trace data from trace buffer 154 to network interface may require additional time. In another example, another advantage may include permitting trace unit 185 to another IHS via the network in parallel, while one or more other components of IHS 110 may perform one or more operations.

In one or more embodiments, trace region header 152 may be utilized by network interface 180. For example, trace region header 152 may include metadata that may be utilized by network interface 180 in accessing trace data stored via trace buffer 154. In one or more embodiments, trace region header 152 may store one or more pointers that store one or more addresses of a trace buffer. In one example, the trace buffer may store a circular queue that may store trace data, and a first pointer of the one or more pointers may store an address of a tail of the circular queue. For instance, trace unit 185 may change the address stored via the first pointer when trace unit 185 stores trace data to the circular queue. In another example, the trace buffer may store a circular queue that may store trace data, and a second pointer of the one or more pointers may store an address of a head of the circular queue. For instance, network interface 180 may change the address stored via the second pointer when network interface 180 retrieves trace data from the circular queue. In one or more embodiments, IHSFW 172 may be utilized in configuring one or more of trace region header 152 and network interface 180. In one or more embodiments, trace buffer 154 may be or include a circular queue. For example, network interface 180 may access the circular queue to for newly added trace data. For instance, network interface 180 may provide the newly added trace data from the circular queue to the network.

In one or more embodiments, trace unit 185 may be configured to filter trace data. In one example, trace unit 185 may filter the trace data based on a subset of processor instructions. For instance, trace unit 185 may capture the trace data in accordance with a subset of instructions of processor 120. In another example, trace unit 185 may filter the trace data based on one or more events. For instance, trace unit 185 may capture the trace data in accordance with one or more interrupts and/or one or more message signal interrupts, among others. In one or more embodiments, trace unit 185 filtering trace data may permit filtered trace data to be stored via IHS 110. For example, the filtered trace data to be stored via non-volatile memory medium 160.

In one or more embodiments, two or more trace buffers may utilize different network interfaces. For example, trace unit 185 may capture trace data associated with two or more processor cores, and the trace data associated with each core of the two or more processor cores may be stored in a respective trace buffer. In one instance, first one or more respective trace buffers may be associated with a RDMA system, process, and/or method that utilizes network interface 180A. In a second instance, second one or more respective trace buffers may be associated with a RDMA system, process, and/or method that utilizes network interface 180B. In one or more embodiments, IHS 110 may include multiple processors 120 (not explicitly illustrated). In one example, processor 120 may include multiple processor cores. In another example, each of multiple processors 120 (not explicitly illustrated) may include a single processor core.

Figure 2:
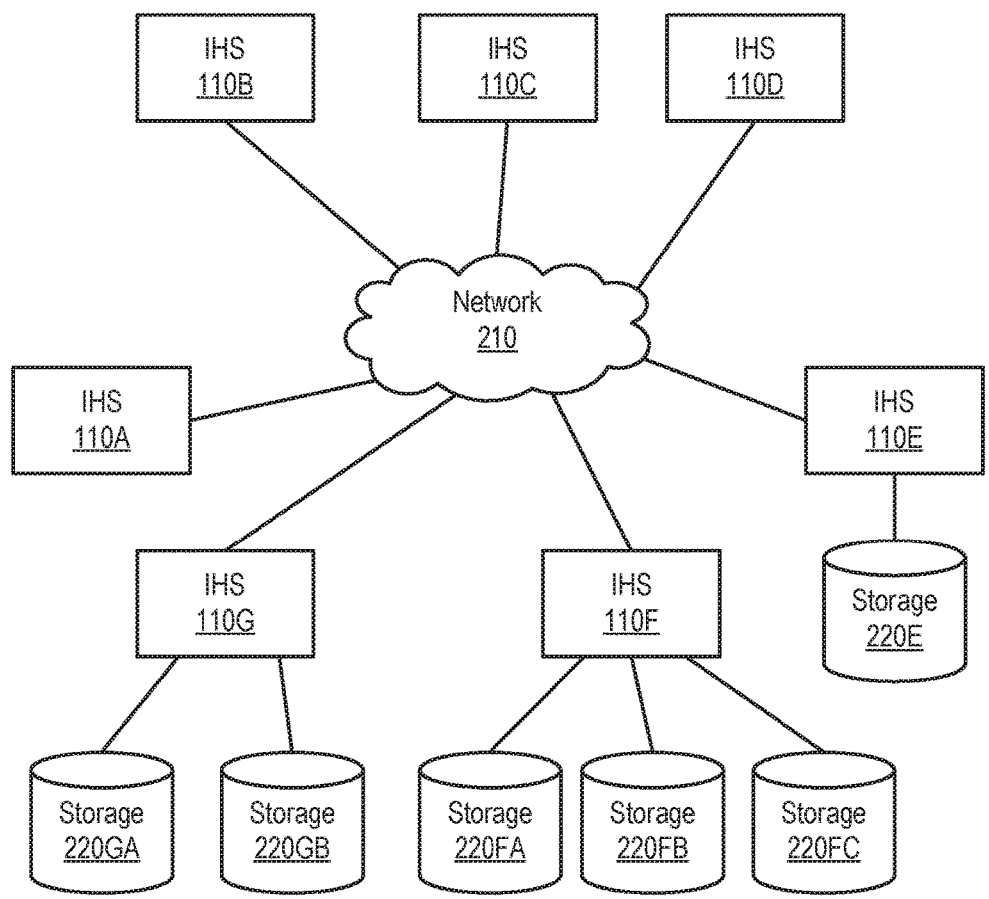
FIG. 2 illustrates an exemplary computing environment, according to one or more embodiments.

Turning now to FIG. 2, an exemplary computing environment is illustrated, according to one or more embodiments. As shown, information handling systems (IHSs) 110A-110G may be coupled to a network 210. In one or more embodiments, network 210 may include a wired network, a wireless network, an optical network, or a combination of the foregoing, among others. For example, network 210 may include and/or be coupled to various types of communications networks. For instance, network 210 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others.

As shown, one or more storages 220 may be communicatively coupled an IHS 110. For example, a storage 220E may be communicatively coupled to IHS 110E, storages 220FA-220FC may be communicatively coupled to IHS 110F, and storages 220GA and 220GB may be communicatively coupled to IHS 110G. In one or more embodiments, an IHS 110 may include one or more one or more storages 220.

In one or more embodiments, one or more of IHSs 110A-110D may provide data to one or more of IHSs 110E-110G via network 210. For example, one or more of IHSs 110E-110G may store the data via one or more respectively communicatively coupled storage 210. For instance, the data may include trace data from one or more respective trace units 185 of one or more of IHSs 110A-110D.

In one or more embodiments, one or more of IHSs 110E-110G and storages 210E, 210FA-210FC, 210GA, and 210GB may form one or more of a SAN and a NAS, among others. In one or more embodiments, one or more of IHSs 110E-110G and storages 210E, 210FA-210FC, 210GA, and 210GB may be utilized in providing a storage service. For example, the storage service may cater to receiving and storing trace data from one or more IHSs. In one instance, the service may be offered for a fee. In another instance, the service may be offered as a part of a membership (e.g., a membership benefit).

In one or more embodiments, the service may be or include a metered service. In one example, a reservation of a trace unit may be metered. In another example, the metered service may include network traffic. In one or more embodiments, the service may be dynamically enabled. For example, memory (e.g., storage space of volatile memory 150) and a device driver for network interface 180 may be included in the metered service. In one or more embodiments, the service may be or include a security repudiation service. For example, trace unit 185 may capture one or more events that indicate one or more intrusions. For instance, the service may filter events that are indicative of one or more intrusions.

In one or more embodiments, stored trace data may be utilized in one or more analyses. For example, the stored trace data may be utilized in profiling a set of processor instructions. In one instance, a profiler may utilize the stored trace data in profiling one or more of APPs 164-168, among others. In another instance, the profiler may utilize the stored trace data in profiling OS 162, among others. In one or more embodiments, a profiler may utilize stored trace data in measuring one or more of an amount of memory, an amount of time, a frequency of instruction usage, and a duration of a subroutine, among others. For example, the profiler may utilize one or more of an event-based technique and a statistical technique in analyzing the stored trace data.

Figure 3:
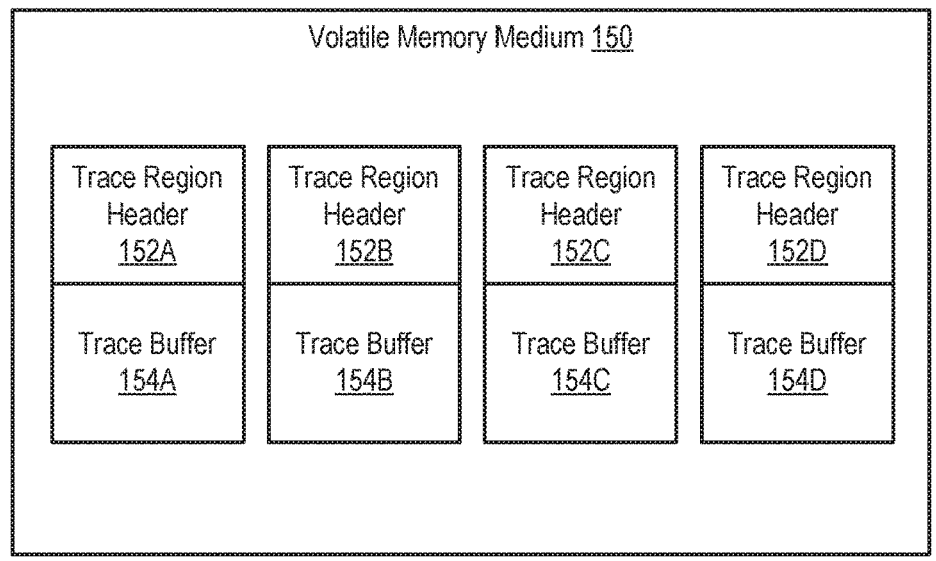
FIG. 3 illustrates multiple trace buffers, according to one or more embodiments.
Figure 3:
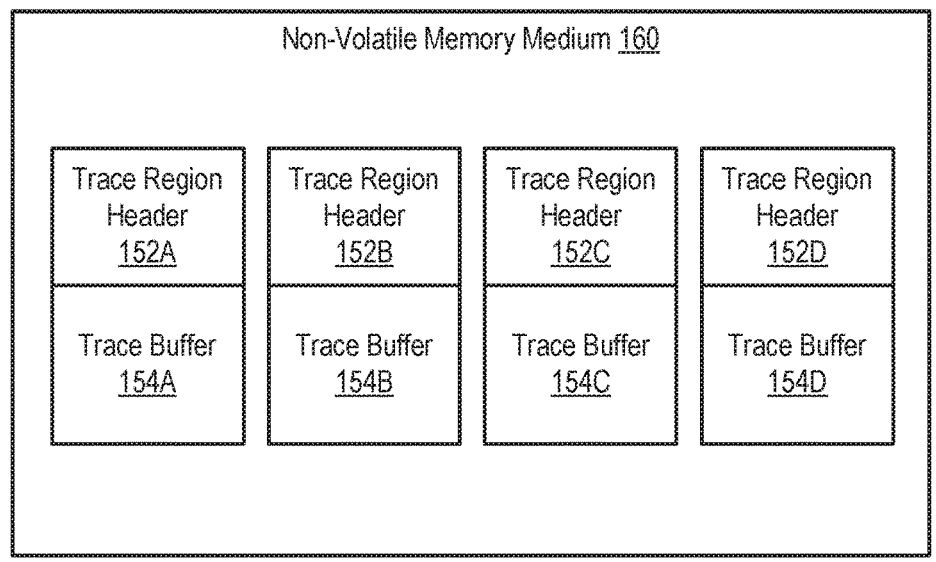

Turning now to FIG. 3, multiple trace buffers are illustrated, according to one or more embodiments. As shown, volatile memory medium 150 may include trace region headers 152A-152D and corresponding trace buffers 154A-154D. As illustrated, non-volatile memory medium 160 may include trace region headers 152A-152D and corresponding trace buffers 154A-154D. In one or more embodiments, trace unit 185 may store trace data via one or more of trace buffers 154A-154D. In one example, trace unit 185 may store trace data associated with a first processor core via trace buffer 154A and store trace data associated with a second processor core, different from the first processor core, via trace buffer 154B. In a second example, trace unit 185 may store trace data associated with one or more events via trace buffer 154C. In another example, trace unit 185 may store filtered trace data via trace buffer 154D.

In one or more embodiments, one or more of trace buffers 154A-154D may be associated with a network interface. In one example, trace buffers 154A-154C may be associated with network interface 180A. For instance, network interface 180A may be included in a RDMA system, process, and/or method that includes utilizing trace buffers 154A-154C. In a second example, trace buffer 154D may be associated with network interface 180B. For instance, network interface 180B may be included in a RDMA system, process, and/or method that includes utilizing trace buffer 154D. In another example, trace buffers 154A and 154B may be associated with network interface 180A, and trace buffers 154C and 154D may be associated with network interface 180B. For instance, network interface 180A may be included in a RDMA system, process, and/or method that includes utilizing trace buffers 154A and 154B, and network interface 180B may be included in a RDMA system, process, and/or method that includes utilizing trace buffers 154D and 154D.

Figure 4:
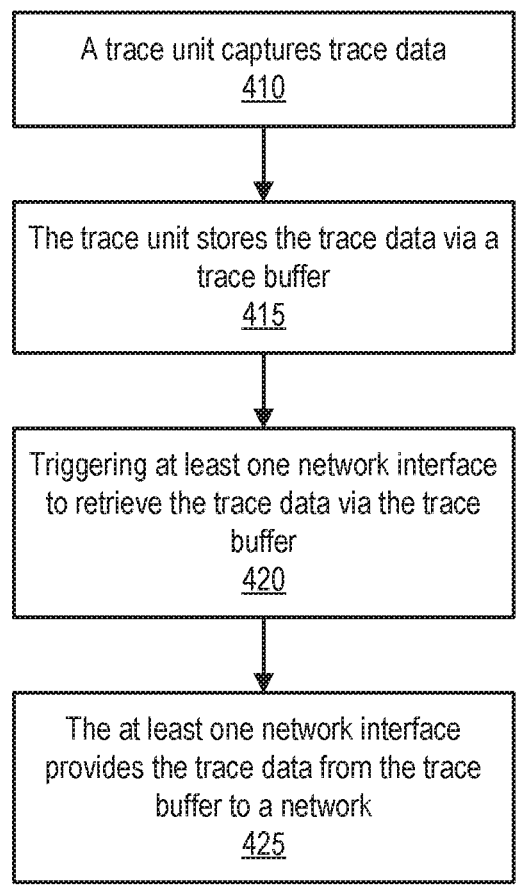
FIG. 4 illustrates a method of operating an information handling system, according to one or more embodiments.

Turning now to FIG. 4, a method of operating an information handling system is illustrated, according to one or more embodiments. At 410, a trace unit may capture trace data. For example, trace unit 185 may capture trace data from various sources of IHS 110. At 415, the trace unit may store the trace data via a trace buffer. For example, trace unit 185 may store the trace data via trace buffer 154. In one or more embodiments, trace unit 185 may store the trace data via multiple trace buffers. For example, trace unit 185 may store the trace data via two or more of trace buffers 154A-154D.

At 420, at least one network interface may be triggered to retrieve the trace data via the trace buffer. In one example, network interface 180A may be triggered to retrieve the trace data via trace buffer 154. In a second example, network interface 180B may be triggered to retrieve the trace data via trace buffer 154. In a third example, network interface 180A may be triggered to retrieve the trace data via trace buffer 154A. In another example, network interface 180B may be triggered to retrieve the trace data via trace buffer 154D.

In one or more embodiments, triggering the at least one network interface to retrieve the trace data via the trace buffer may include modifying a pointer to an address of the trace buffer. For example, the trace buffer may include a circular queue that may store the trace data, and the address of the trace buffer may be an address of a tail of the circular queue. For instance, the address of the tail of the circular queue may be changed (e.g., changed by trace unit 185) as new trace data is stored via the circular queue. In one or more embodiments, triggering the at least one network interface to retrieve the trace data via the trace buffer may include modifying trace region header 152. For example, trace region header 152 may store an address of a tail of a circular queue stored via trace buffer 154. For instance, the address of the tail of the circular queue may be changed (e.g., changed by trace unit 185) as new trace data is stored the circular queue.

In one or more embodiments, triggering the at least one network interface to retrieve the trace data via the trace buffer may include a timer expiring after an amount of time transpires. For example, the timer expiring may trigger the at least one network interface to retrieve the trace data via the trace buffer. In one or more embodiments, the amount of time that transpires may be modified to determine an appropriate amount of time to retrieve data from the trace buffer. For example, after the timer expiring after the amount of time transpires, an amount of the trace data stored via the trace buffer may be determined. In one instance, if the amount of the trace data stored via the trace buffer is above a threshold (e.g., a high-water mark, an optimal capacity threshold, etc.), the amount of time may be decreased. In another instance, if the amount of the trace data stored via the trace buffer is below the threshold, the amount of time may be increased. In one or more embodiments, trace unit 185 may determine the amount of data stored via the trace buffer after the timer expires and increase or decrease the amount of time until the timer expires again.

In one or more embodiments, an amount of time that transpires until the timer expires may include a predicted amount of time that trace unit 185 utilizes in storing trace data from processor 120. In one example, processor 120 may include multiple cores, and the amount of time that trace unit 185 utilizes in storing trace data from processor 120 may be modified and/or adjusted by a number of the multiple cores. In another example, the amount of time that trace unit 185 utilizes in storing trace data from processor 120 may be modified and/or adjusted by one or more clock rates (e.g., frequencies) of respective one or more cores of processor 120.

At 425, the at least one network interface may provide the trace data from the trace buffer to a network. For example, network interface 180 may provide the trace data from trace buffer 154 to network 210. In one instance, network interface 180A may provide the trace data from trace buffer 154 to network 210. In a second instance, network interface 180B may provide the trace data from trace buffer 154 to network 210. In a third instance, network interface 180A may provide the trace data from trace buffer 154B to network 210. In another instance, network interface 180B may provide the trace data from trace buffer 154D to network 210.

In one or more embodiments, the method of FIG. 4 may be repeated. For example, the method of FIG. 4 may be repeated in capturing new trace data. In one instance, the method of FIG. 4 may be repeated a number of times. In another instance, the method of FIG. 4 may be repeated a number until it explicitly halted.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
    a trace hub;
    a network interface configured to be coupled to a network; and
    a memory medium that stores a trace buffer accessible by the trace hub and the network interface;
    wherein the trace hub is configured to:
        store trace data via the trace buffer;
        modify a pointer to an address of the trace buffer; and
        modify a trace region header that stores an address of a tail of a circular queue that stores the trace data; and
    wherein the network interface is configured to:
        in response to the trace hub modifying the pointer to the address of the trace buffer and in response to the trace hub modifying the trace region header that stores the address of the tail of the circular queue that stores the trace data, retrieve the trace data from the trace buffer; and
        provide the trace data from the trace buffer to the network.

2. The information handling system of claim 1, wherein the trace buffer includes the circular queue; and
    wherein the pointer to the address of the trace buffer stores the address of the tail of the circular queue.

3. The information handling system of claim 1, wherein the network interface is further configured to, in response to an expiration of a timer that expires after an amount of time transpires, retrieve the trace data from the trace buffer.

4. The information handling system of claim 3, wherein the trace hub is further configured to:
    after the timer expires after the amount of time transpires, determine an amount of the trace data stored via the trace buffer;
    if the amount of the trace data stored via the trace buffer is above a threshold, decrease the amount of time; and
    if the amount of the amount of the trace data stored via the trace buffer is below the threshold, increase the amount of time.

5. The information handling system of claim 1, wherein the trace hub is further configured to filter the trace data based on at least one of a subset of processor instructions and at least one event before the trace hub stores the trace data via the trace buffer.

6. The information handling system of claim 1, wherein the trace hub is further configured to store the trace data via the trace buffer without involving a main processor of the information handling system and the network interface is further configured to provide the trace data from the trace buffer to the network without involving the main processor of the information handling system.

7. The information handling system of claim 1, wherein at least one of a storage area network (SAN) and a network area storage (NAS) receives and stores the trace data.

8. The information handling system of claim 1, further comprising:
    a plurality of network interfaces that includes the network interface and another network interface, different from the network interface;
    wherein the memory medium stores another trace buffer accessible by the trace hub and the other network interface;
    wherein the trace hub is further configured to:
        store further trace data via the other trace buffer; and
        modify a pointer to an address of the other trace buffer; and
    wherein the other network interface is configured to:
        in response to the trace hub modifying the pointer to the address of the other trace buffer, retrieve the further trace data from the other trace buffer; and
        provide the further trace data from the other trace buffer to the network.

9. A method, comprising:
    a trace hub storing trace data via a trace buffer;
    the trace hub modifying a pointer to an address of the trace buffer;
    the trace hub modifying a trace region header that stores an address of a tail of a circular queue that stores the trace data; and
    in response to the trace hub modifying the pointer to the address of the trace buffer and in response to the trace hub modifying the trace region header that stores the address of the tail of the circular queue that stores the trace data, at least one network interface retrieving the trace data from the trace buffer; and
    the at least one network interface providing the trace data from the trace buffer to a network.

10. The method of claim 9,
    wherein the trace buffer includes the circular queue; and
    wherein the pointer to the address of the trace buffer stores the address of the tail of the circular queue.

11. The method of claim 9, further comprising:
    a timer expiring after an amount of time transpires; and
    in response to the timer expiring after the amount of time transpires, the at least one network interface retrieving the trace data from the trace buffer.

12. The method of claim 11, further comprising:
    after the timer expiring after the amount of time transpires, determining an amount of the trace data stored via the trace buffer;
    if the amount of the trace data stored via the trace buffer is above a threshold, decreasing the amount of time; and
    if the amount of the amount of the trace data stored via the trace buffer is below the threshold, increasing the amount of time.

13. The method of claim 9, further comprising:
    before the trace hub storing the trace data via the trace buffer, filtering the trace data based on at least one of a subset of processor instructions and at least one event.

14. The method of claim 9, wherein the trace hub storing the trace data via the trace buffer, the trace hub modifying the pointer to the address of the trace buffer, and the at least one network interface providing the trace data from the trace buffer to the network are preformed without involving a main processor of an information handling system that includes the trace hub.

15. The method of claim 9, further comprising:
storing the trace data via at least one of a storage area network (SAN) and a network area storage (NAS).

16. The method of claim 9,
wherein the at least one network interface includes a plurality of network interfaces;
wherein the at least one network interface retrieving the trace data from the trace buffer includes a first network interface of the plurality of network interfaces retrieving the trace data from the trace buffer; and
wherein the at least one network interface providing the trace data from the trace buffer to the network includes the first network interface providing the trace data from the trace buffer to the network;
the method further comprising:
the trace hub storing further trace data via another trace buffer;
the trace hub modifying a pointer to an address of the other trace buffer;
in response to the trace hub modifying the pointer to the address of the other trace buffer, a second network interface, different from the first network interface, of the plurality of network interfaces retrieving the further trace data from the other trace buffer; and
the second network interface providing the further trace data from the other trace buffer to the network.

17. The information handling system of claim 1, further comprising:
a main processor that includes the trace hub;
wherein the memory medium is coupled to the main processor; and
wherein the network interface is coupled to the main processor.

18. The method of claim 9, wherein a processor of an information handling system includes the trace hub.

* * * * *